US008516595B2

(12) United States Patent
Oro García et al.

(10) Patent No.: US 8,516,595 B2
(45) Date of Patent: Aug. 20, 2013

(54) METHOD AND SYSTEM FOR ESTIMATING THE RELIABILITY OF BLACKLISTS OF BOTNET-INFECTED COMPUTERS

(75) Inventors: David Oro García, Barcelona (ES); Jesús Luna Garcia, Mexico City (MX); Antonio Felguera Segador, Sant Joan Despi (ES); Alexander Marquardt, Winnipeg (CA); Marc Vilanova Vilasero, Olot (ES)

(73) Assignees: Caixa d'Estalvis I Pensions de Barcelona "La Caixa", Barcelona (ES); Fundacio Barcelona Digital Centre Tecnologic, Barcelona (ES)

( * ) Notice: Subject to any disclaimer, the term of this patent is extended or adjusted under 35 U.S.C. 154(b) by 159 days.

(21) Appl. No.: 12/980,056

(22) Filed: Dec. 28, 2010

(65) Prior Publication Data
US 2012/0167210 A1 Jun. 28, 2012

(51) Int. Cl.
*H04L 29/06* (2006.01)
(52) U.S. Cl.
USPC .............................. 726/25; 726/23
(58) Field of Classification Search
USPC .............................. 726/25, 23, 24
See application file for complete search history.

(56) References Cited

U.S. PATENT DOCUMENTS

| 2008/0028463 A1 | 1/2008 | Dagon et al. |
| 2009/0064332 A1* | 3/2009 | Porras et al. ................. 726/23 |
| 2010/0037314 A1 | 2/2010 | Perdisci et al. |
| 2010/0095374 A1 | 4/2010 | Gillum et al. |

OTHER PUBLICATIONS

Noh et al. "Detecting P2P Botnets using a Multi-Phased Flow Model." *IEEE*. 2009. pp. 247-253.
Strayer et al. "Detecting Botnets with tight command and control." *IEEE*. 2006. pp. 195-202.

* cited by examiner

*Primary Examiner* — Edward Zee
(74) *Attorney, Agent, or Firm* — Merchant & Gould P.C.

(57) ABSTRACT

A system and a method for determining the reliability of blacklists is disclosed. Each blacklist comprises IP addresses of supposedly infected computers. The reliability is computed by analyzing whether the blacklist reports or not controlled infections from sandboxed environments and by measuring the elapsed time between reported infections and disinfections. The obtained information is then used in combination with several metrics for determining the trustworthiness of the IP address of a given Internet host that requests an online transaction with the purpose of granting or denying access to a service.

17 Claims, 6 Drawing Sheets

US 8,516,595 B2

METHOD AND SYSTEM FOR ESTIMATING THE RELIABILITY OF BLACKLISTS OF BOTNET-INFECTED COMPUTERS

FIELD OF THE INVENTION

The present invention pertains to the field of computer security. Still more particularly, this invention relates to computer networking methods for determining the reputation and trustworthiness of IP addresses with the aim of detecting infected computers that are trying to log into an online web service.

BACKGROUND OF THE INVENTION

Botnets are networks of hijacked computers that are coordinated by a bot herder with the purpose of carrying out attacks such as Distributed Denial of Service (DDoS), spam or stealing authentication credentials. Each one of the nodes that constitutes the botnet has been previously infected by malware that was specifically designed for compromising and controlling their computing capabilities. The infection process is usually achieved through remotely exploiting vulnerabilities in the API of the different components (i.e. network stack or memory allocation routines) that constitute the underlying Operating System (OS). Other infection vectors might locally exploit vulnerabilities in user space applications that could open the door to privilege escalation. The infected computers that constitute a botnet periodically poll special nodes known as Command and Control (C&C) nodes with the purpose of downloading updated malware code or uploading stolen information. The bot herder that rules the network of hijacked machines has the capability to issue new commands for setting the target machine of an attack (i.e. IP address or domain name) or simply gather information such as authentication credentials, passwords and keystroke logs.

The present invention solves the problem of determining the likelihood of botnet infection of a given IP address that corresponds to an Internet host. The present invention also solves the problem of benchmarking the accuracy of IP blacklist providers when they are reporting infections of networks of hijacked computers such as botnets.

There are several methods that can be used for mitigating the impact of botnets and most of them rely on forcing a communication disruption between the C&C nodes. Most of the currently available methods perform a technique known as sinkholing for dismantling botnet infrastructures. Such a technique can exploit the fact that hijacked computers that are members of a botnet usually establish connections with the C&C node by using DNS requests. In this way, it is then possible for a given ISP provider which manages name servers to monitor DNS queries and resolve domain names to fake IP addresses if they are blacklisted or tagged as malicious. A domain name is then considered as malicious if the IP addresses that resolve to it belong to hosts that are massively spreading malware or constitute the C&C infrastructure of a botnet. If a botnet avoids DNS resolution for determining the IP addresses of C&C nodes and relies instead on direct connections (i.e. with hard-coded IP addresses) ISP providers can still block malicious requests. This blocking process can be implemented in conventional routers or in firewall equipment specifically designed for avoiding DDoS attacks.

Other proposed mechanisms try to characterize patterns of traffic with the purpose of detecting abnormal behavior and then blacklist the IP addresses of the Internet hosts that are conducting an attack.

Dagon et al. in US2008/0028463A1 propose a flow-based detection system that uses statistical analysis of data such as the DNS request and SYN connection rates of hijacked computers or bots.

Guillum et al. in US2010/0037314A1 describe a method based on exponentially weighted moving averages and graphs for detecting bots that massively sign up new webmail accounts with the purpose of sending spam messages.

Perdisci et al. in US2010/0095374A1 propose a system based on statistical collectors and Internet search engines for detecting botnet-related domain names.

Strayer et al. in "Detecting botnets with tight command and control", Proceedings of the $31^{st}$ IEEE Conference on Local Computer Networks, 2006, pp. 195-202, ISBN 1-4244-0418-5 describe a method for detecting botnets that examines flow characteristics such as bandwidth, duration and packet timing.

Noh et al. in "Detecting P2P botnets using a multi-phased flow model", Proceedings of the $3^{rd}$ International Conference on Digital Society, 2009, pp. 247-253, ISBN 978-1-4244-3550-6 propose a method based on Markov models for detecting botnet traffic flows.

The next steps in a botnet detection process would be to reduce false positive rates and further refine its accuracy. This refining process should gather blacklists of IP addresses generated by several of the abovementioned methods and then aggregate all the information with the purpose of building in real time reputational scores for each one of the IP addresses. The obtained scores may then be used for denying or granting the access of botnet-infected nodes to web services such as online banks.

This process would be particularly useful for mitigating the losses originating from botnets and malware that specifically target financial institutions (i.e. those that steal customer credentials and then withdraw money from savings or checking accounts without user's knowledge).

SUMMARY OF THE INVENTION

The present invention refers to a method and a system for determining the trustworthiness of the IP address of a given Internet host that is trying to request an online transaction. This trustworthiness is obtained by aggregating information from multiple IP blacklist providers and by dynamically estimating their reliability.

One object of the present invention is to provide a computer-implemented method for evaluating the reliability of blacklists from providers. The said method comprises fetching one or more blacklists from one or more providers. The fetching step may be performed more than once at different time intervals. The method also comprises gathering infection timestamps and IP addresses for each computer in a group of infected computers pertaining to a malware pool that runs in a sandboxed environment. Thus, for each blacklist, the method checks and registers whether there exists in the blacklist any IP addresses that match with those of the computers that constitute the malware pool. With such data, an interval of time is then calculated. This interval of time is known as the blacklist IP latency. The latency defines the first presence of each matching IP address in the blacklist in dependence upon the time of infection of the computer having the IP address and the time of fetching the blacklists. Then the blacklist can be evaluated by estimating a reliability degree in dependence upon the number of matching IP addresses in the blacklist and the corresponding IP blacklist latencies.

The fact that a given IP is included in a blacklist offered by a provider, does not always imply that the given IP address is infected. For example, IP addresses that are reported by a blacklist provider as infected may be pointing to hosts that are different from those that were originally detected as infected due to the use of DHCP address assignment schemes.

According to an aspect of the present invention, the computer-implemented method is adapted to perform a control for online transactions. It uses the estimated reliability of a given blacklist to deny or grant a transaction of a host, when the said host has its IP address included in the blacklist.

Another object of the present invention is to provide a computer-implemented system for evaluating the reliability of blacklists from providers. The system comprises a fetching unit that gathers timestamps and IP addresses for each computer in a group of infected computers pertaining to a malware pool. The fetching unit also fetches at least one blacklist from at least one provider. The system further comprises a checking unit that receives information from the fetching unit, the checking unit configured to check for each computer in the group whether there exists in the blacklist an IP address matching an IP address of a computer in the group and registers a first presence of each matching IP address in the blacklist. It also includes a processing unit that interchanges information with the checking unit and calculates a blacklist IP latency for the first presence of each matching IP address in the blacklist. The processing unit further estimates a blacklist reliability degree in dependence upon the number of matching IP addresses in the blacklist and the corresponding IP blacklist latencies.

Also, in accordance with the method, the system proposes an access control mechanism for online transactions. This method is performed by the reputation unit which cooperates with the processing unit in order to establish a reputation score for a given IP address. The reputation score is a function based on parameters that were previously calculated for several blacklists in accordance with the inclusion of the said IP address. The reputation unit may define an IP reputation score that when compared with a security threshold gives a measure of the risk and therefore it may serve to take further actions.

These and other features and advantages provided by the invention will be better and more completely understood by referring to the following detailed description of presently preferred embodiments in conjunction with the accompanying drawings.

DETAILED DESCRIPTION OF THE INVENTION

Figure 1:
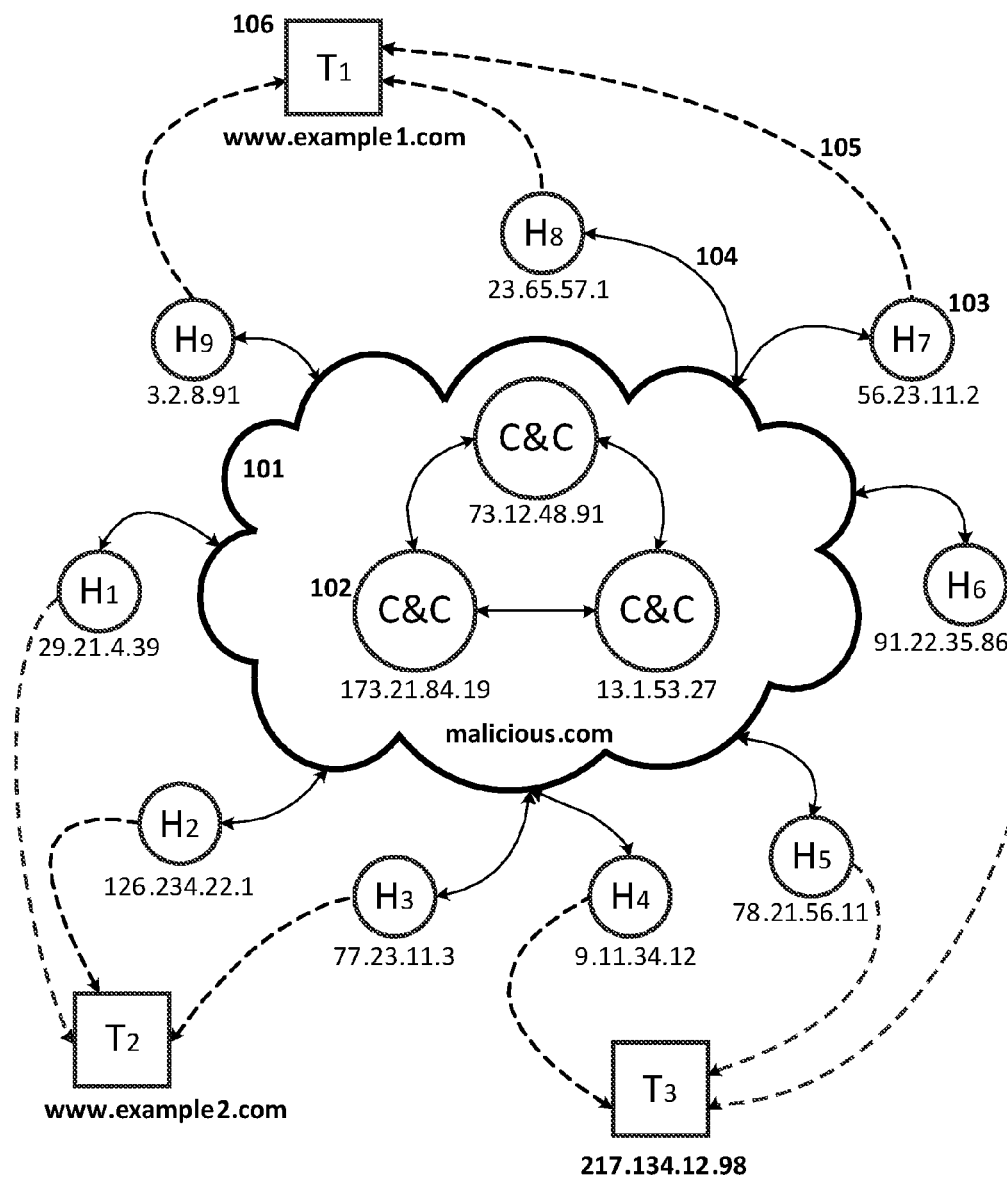
FIG. 1 shows the general structure of a botnet.
Figure 2:
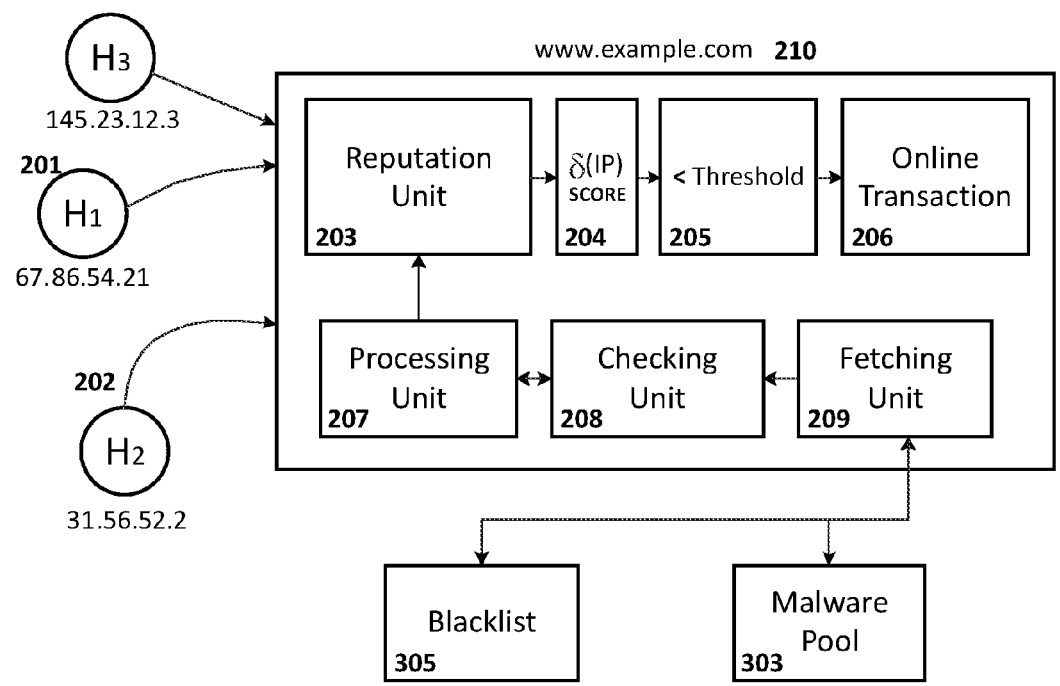
FIG. 2 shows the application of the invention in a given online service.

As shown in FIG. 1, a botnet 101 is a network of infected computers 103 that interchange information 104 with a collection of nodes known as Command and Control nodes (C&C) 102. The hijacked nodes 103 that constitute a botnet 101 can be instructed to set the target domain names or IP addresses 106 of a given online service with the purpose of conducting attacks 105. Once all the malicious activity of those nodes has been detected, it is common to gather the IP addresses of the infected hosts 103 with the purpose of blacklisting them. Those blacklists 305 can then be used for blocking the requests 202 of malicious hosts in firewall equipment or for increasing the threat level 205 in an online web service. In this way, it would be possible to build a reputation or scoring metric 204 for the IP address of a given Internet host 201 that is trying to log in 202 a website 210 as depicted in FIG. 2. The reputation score 204 can be used for blocking specific real-time transactions 206 such as online banking or shopping if the computed score 204 of an IP address violates a pre-established threshold or threat level 205. In order to avoid false positives related to IP addresses that may correspond to old DHCP leases from an ISP provider, the accuracy of the blacklists must be dynamically computed.

Figure 3:
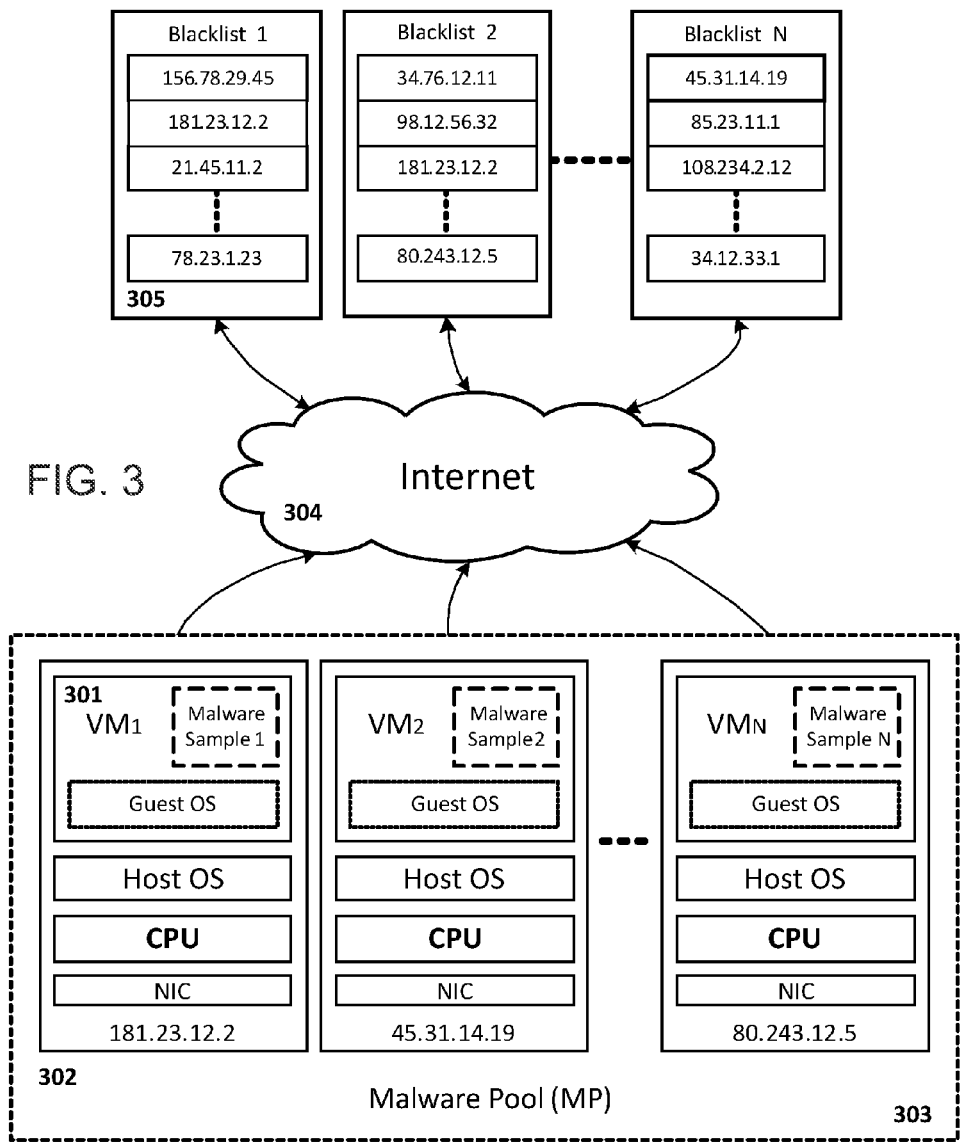
FIG. 3 shows the general architecture of the malware pool.

The present invention further refines blacklists 305 generated by other botnet detection methods by aggregating the IP addresses and by ranking them in real time with the purpose of building a score for each one of the blacklisted IP addresses 305. This ranking method is implemented through the use of controlled infections in sandboxed machines or virtualized environments 301 as is shown in FIG. 3. These machines run viruses, worms and malware that periodically poll 104 different C&C nodes 102 with the purpose of setting up or joining a botnet 101. This set of machines that run on a controlled environment are known as the malware pool or MP 303. All machines that belong to the MP are connected to the Internet 304 through multiple ISP providers and have been previously configured with a different IP address. Since the MP may try to establish connections with C&C nodes 102 or spread by itself through the Internet, the infection attempts could be detected by multiple security providers and research institutions that are offering IP blacklisting services 305. Those blacklists 305 may include IP addresses of machines that belong to the MP 303 and thus it would be possible to measure their detection accuracy when detecting botnets providers just by looking for known MP IP addresses as is depicted in FIG. 3. Once all required measurements have been done, the malware binaries that are running in the virtualized environments 301 can be automatically removed and MP machines disinfected by restoring a clean state from virtual OS images that have been previously saved for this purpose. In this way, all MP nodes 302 that joined a malicious botnet 101 can be dismantled and all infection attempts to other Internet nodes 304 immediately stopped. This method can be formally modeled as follows.

Let B be the set of all publicly available blacklists 305 $B=\{B_0, \ldots, B_{m-1}\}$ that are reporting botnet infections, we define a blacklist $B_i$ as a subset of network IP addresses $B_i=\{IP_0, \ldots, IP_{n-1}\}$. Each one of the $IP_k \in B_i$ constitutes a combination of a host IP addresses with its corresponding net mask. We also define the concept of blacklist latency $\lambda$ as the period of time $\Delta_t$ between when a controlled infection ($\lambda_{inf}$) or disinfection ($\lambda_{dis}$) has been made by an MP node 302 ($t_{inf}$ or $t_{dis}$ respectively) and reported by a blacklist $t_{rsp}$. Both infection and disinfection latencies could be then computed as:

$$\lambda_{inf} = \Delta_t = t_{rsp} - t_{inf}$$

$$\lambda_{dis} = \Delta_t = t_{rsp} - t_{dis}$$

Similarly, we also define I as the set of infected IP addresses $I=\{IP_0, \ldots, IP_{n-1}\}$ and $T_{inf}$ as the set of timestamps when infections where detected $T_{inf}=\{T_{inf_0}, \ldots, T_{inf_{n-1}}\}$. Assuming that n infected hosts will be considered, the size of both sets $n=|I|=|T|$ will be exactly the same. This assumption can also be done with the set of timestamps related to the disinfection process $T_{dis}=\{T_{dis_0}, \ldots, T_{dis_{n-1}}\}$.

Figure 4:
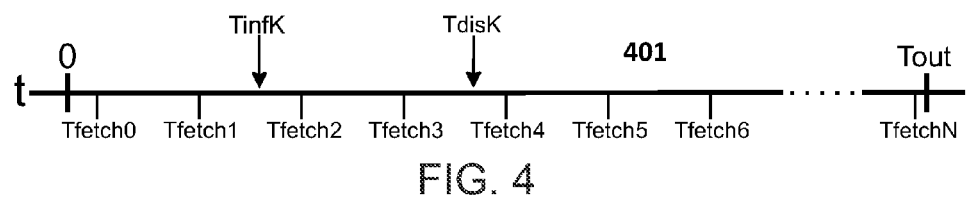
FIG. 4 shows the timeline of controlled infections.

Let $IP_k \in I$, that is, the IP address from an infected host k that belongs to the MP 303, we define and $T_{inf_k}$ and $T_{dis_k}$ as the periods of time when the host k is detected to be infected and disinfected with botnet viruses or malware. As is shown in FIG. 4, each blacklist $B_i \in B$ 305 is fetched at the same time in parallel from different providers at $T_{fetch}$ intervals 401 by the fetching unit 209 and come to an end when it reaches $T_{out}$. Since a given blacklist $B_i$ may report $IP_k$ as infected, we would obtain a $\Gamma$ set of latencies. As a result, $\Gamma(B_i) = \{\lambda_0, \ldots, \lambda_{m-1}\}$ and it would be then possible to build a matrix L with the purpose of encoding the whole information set. Due to the fact that we assume m blacklist providers and n infections where $m=|B|$ and $n=|I|$, we define L as the complete set of obtained latencies.

That is $L=\{\Gamma(B_0), \ldots, \Gamma(B_{m-1})\}=\{\{\lambda_{00}, \ldots, \lambda_{0(n-1)}\}, \ldots, \{\lambda_{(m-1)0}, \ldots, \lambda_{(m-1)(n-1)}\}\}$ and latency of the infected $IP_j$ address in the blacklist $B_i$:

$$L = \begin{pmatrix} \lambda_{00} & \lambda_{01} & \ldots & \lambda_{0(n-1)} \\ \lambda_{10} & \lambda_{11} & \ldots & \lambda_{1(n-1)} \\ \vdots & \vdots & \ddots & \vdots \\ \lambda_{(m-1)0} & \lambda_{(m-1)1} & \ldots & \lambda_{(m-1)(n-1)} \end{pmatrix}$$

Since infected IP addresses from the MP 303 could be reported in blacklists in days, weeks or even not reported at all ($t \downarrow rep = T \downarrow out$) a mapping function $f: N \rightarrow N$ is defined with the purpose of shrinking latencies into a logarithmic scale:

$$f(\lambda) = \begin{cases} \log(\lceil T_{out} \rceil), & \lambda = 0 \\ \log(\lambda), & \lambda > 0 \\ -\log(|\lambda|), & \lambda < 0 \end{cases}$$

With a combination of both the defined metrics and L matrix it is possible to measure the responsiveness $\gamma$ of a given botnet blacklist provider $B_i \in B$ 305 as the average reported latencies for that list:

$$\gamma(B_i) = \frac{\sum_{j=0}^{|B_i|} f(L_{ij})}{|I|}$$

Similarly, completeness $\chi$ is computed as a factor between the number of infected IP addresses reported by a given blacklist $B_i \in B$ 305 and the total amount of infected hosts $|I|$ that belong to the MP 303. In order to perform this computation, $\psi(B_i)$ defines the set of latencies that are not equal to the predefined timeout $T_{out}$:

$$\psi(B_i) = \left| \bigcup_{j=0}^{|B_i|} L_{ij} \neq \lceil \log(T_{out}) \rceil \right|$$

$$\chi(B_i) = \frac{\psi(B_i)}{|I|}$$

Figure 5:
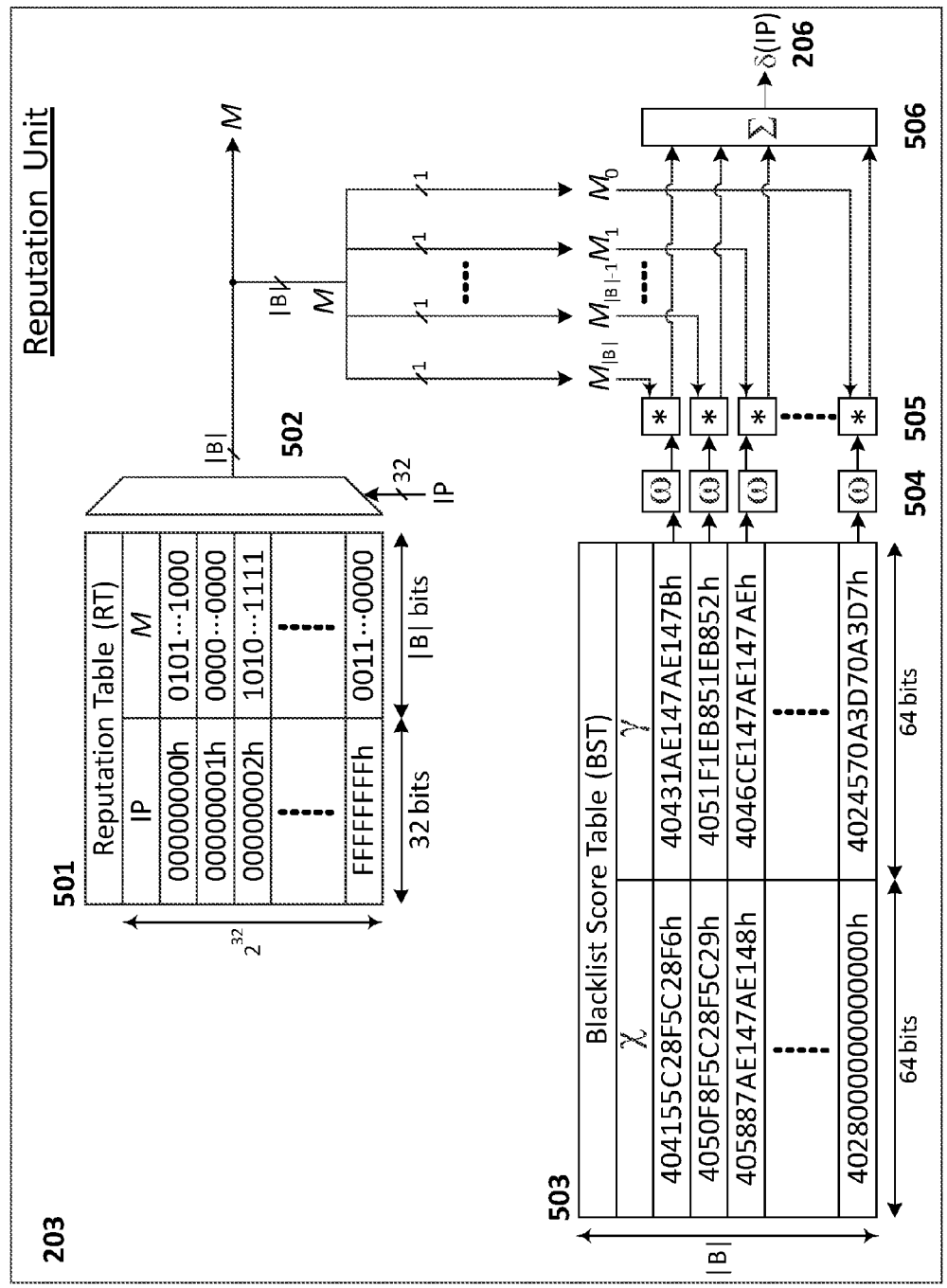
FIG. 5 shows the architecture of the reputation unit.

For each one of the blacklists $B_i \in B$, $\gamma(B_i)$ and $\chi(B_i)$ will be stored in a blacklist score table or BST 503 as depicted in FIG. 5. Later they will be used as an input for calculating the trustworthiness $\overline{\omega}(B_i)$ 504 of a given blacklist $B_i$:

$$\varpi(B_i) = \frac{\chi(B_i)}{\gamma(B_i)}$$

With the use of the abovementioned metric, a reputation score for a given IP address $\delta(IP)$ 204 is then constructed by encoding in a bitmap M that represents whether it was possible to find any matches inside a blacklist $B_i (0 \leq i \leq |B|)$ or not as is shown in FIG. 5:

$$M_i = \begin{cases} 1, & \text{if } IP \in B_i \\ 0, & \text{otherwise} \end{cases}$$

$$W = \{\omega(B_0) \cdot M_0, \ldots, \omega(B_{m-1}) \cdot M_{m-1}\}$$

$$\delta(IP) = \begin{cases} \{\phi\}, & \text{if } AB_i \in B: IP \in B_i \\ \{W\}, & \text{otherwise} \end{cases}$$

As it is also depicted in FIG. 5, the whole IPv4 address space (4 billion addresses) is stored in a reputation table RT 501. This table can be efficiently stored in DRAM memory with the purpose of reducing IP lookup latencies when performing all the required computations of the $\delta(IP)$ function 204. With this function it is possible to determine if a given Internet host 201 that is trying to access to 202 an online web service 210 has been infected and is an actual member of a botnet 101. Each one of the IP addresses of the whole IPv4 set is also accompanied with a n-bit bitmap and the $\omega(i)$ function 504 that encodes which $B_i \in B$ blacklist 305 has reported an IP address as infected and the corresponding blacklist trustworthiness. As is depicted in FIG. 5, the RT 501 is indexed by an IP address and its corresponding M value selected by a multiplexer 502.

In order to achieve high scalability and parallelization, the reputation table 501 may be replicated with the same information n times. If the computed $\delta(IP)$ function or score 204 returns a value that is greater than the predefined threat level or threshold 205 that has been previously defined, the online transaction 206 that the malicious remote host is trying to perform will be automatically rejected.

Figure 6:
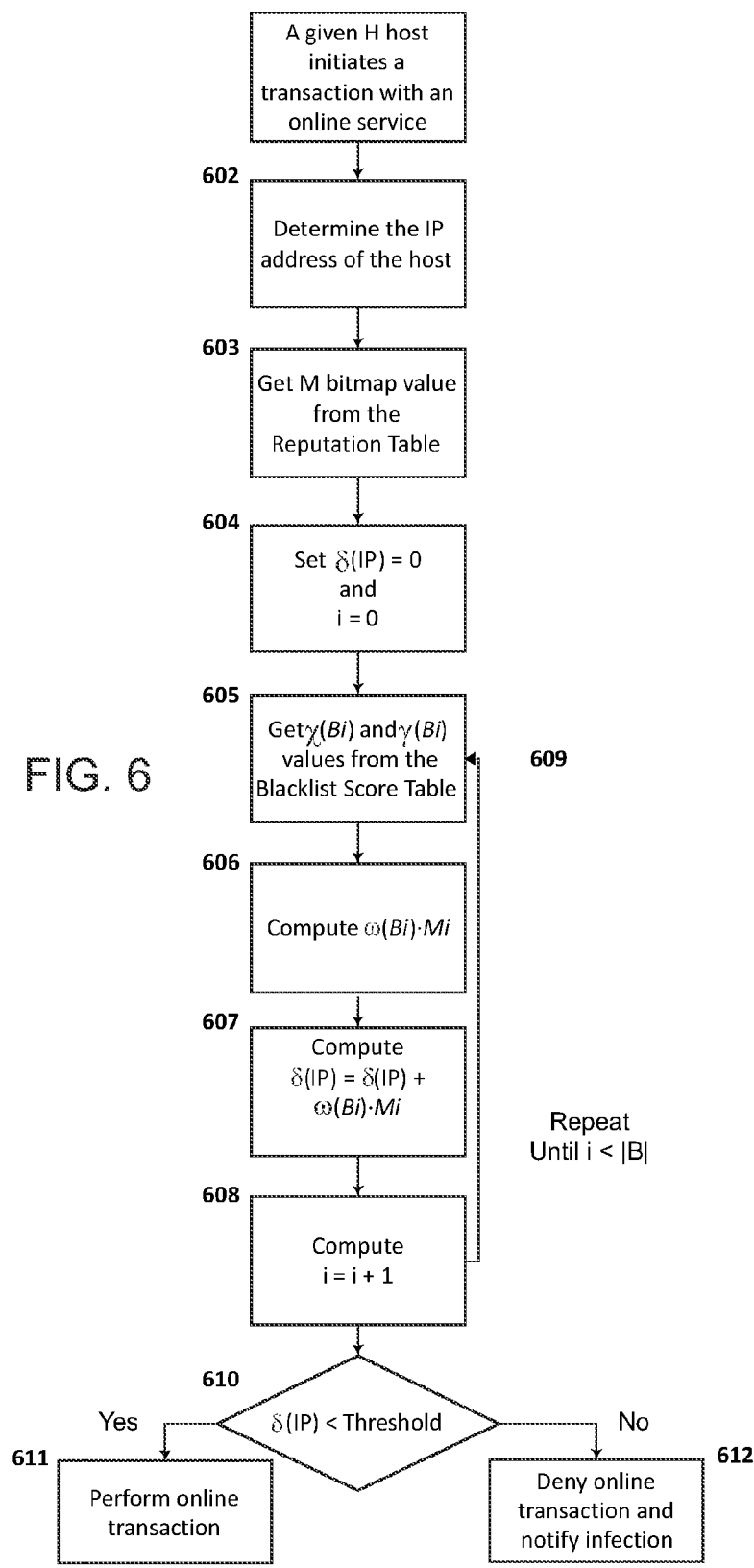
FIG. 6 shows the decision flow of the access control.

FIG. 6 shows the decision flow that is used by the present invention for granting or denying the access to the web service 210 that must be protected. The process starts in 601 when a given Internet host 201 initiates a transaction request 202. In 602, the IP address of the accessing host is determined and then 603 the reputation table queried. Once the bitmap M value that corresponds to the IP address has been obtained, the reputation of the IP address $\delta(IP)$ 204 can be computed. This computation can be performed in a loop by combining all $\gamma$ and $\chi$ values from the blacklist score table through the use of the $\overline{\omega}$ 504 function. Initially, the reputation is set to zero 604 and for each $B_i \in B$ blacklist considered $\gamma(B_i)$ and $\chi(B_i)$ are obtained 605 by querying the BST. At this point, a partial $\delta(IP)$ value is computed in 606 and 607 by multiplying 505 the $\overline{\omega}(B_i)$ value 504 with the $M_i$ value corresponding to the $B_i$ blacklist. This method is iteratively repeated 608 until all $\gamma(B_i), \chi(B_i)$ and $M_i$ values from the considered blacklists have been processed 609. As is shown in FIG. 5, the computations 605 606 607 that are performed during this loop 609 can be efficiently computed in parallel due to the fact that there are no data dependencies among them. The output of the multipliers 505 depicted in FIG. 5 serve as an input for an adder 506 that computes the final reputation $\delta(IP)$ value 204 of the IP address of the accessing host.

At this point, the obtained δ(IP) reputation 204 is compared with a previously defined threshold value through the rule defined in 610. If the threshold rule is violated, it will indicate that the accessing host is not trustworthy and the transaction request initiated by the host must be denied 612. Otherwise, the transaction will be performed 611.

In addition, an infection notification could be sent to the remote accessing host or to the administrator of the online service for reporting purposes.

Figure 7:
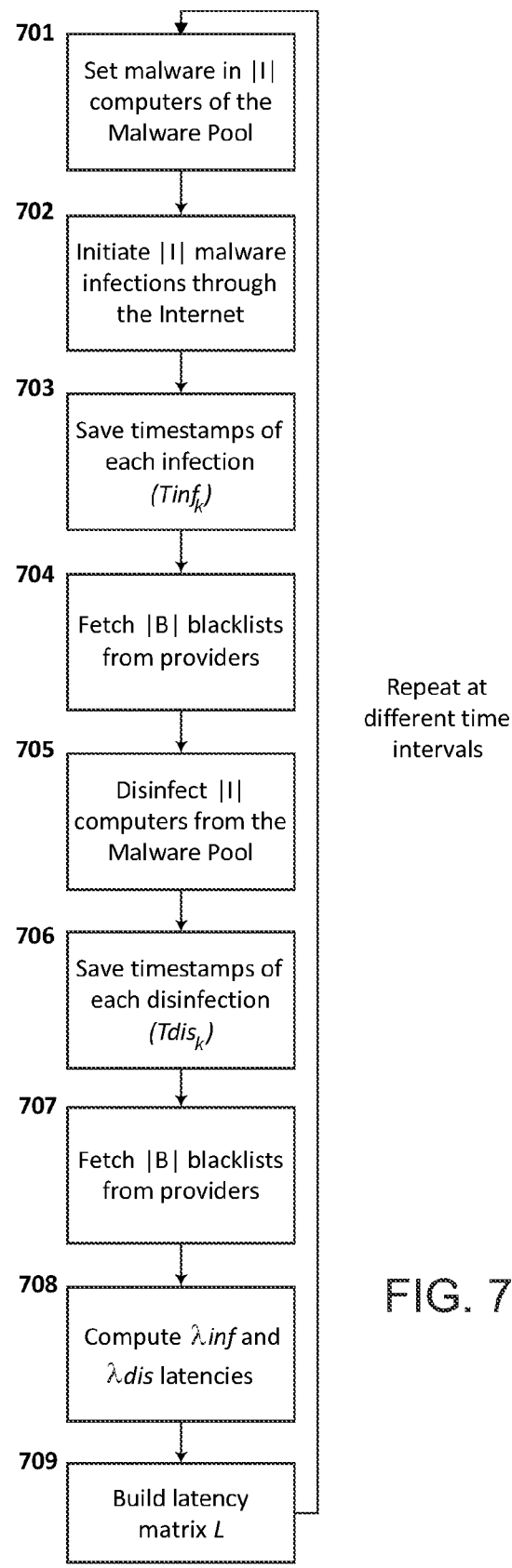
FIG. 7 shows the decision flow of the reputation matrix building process.

FIG. 7 shows the decision flow that is constantly running in background and repeated at different time intervals 401 as has been previously described. In 701, a subset of |I| machines of the malware pool is selected and different pieces of malware are installed in their corresponding sandboxing environment 301. In 702, |I| malware instances are initiated and later 703 their infection timestamps $T_{inf_k}$ 401 saved. In order to determine whether MP nodes 303 are being reported (T↓ ([(rep)]↓k)) by a third party or not, |B| blacklists are fetched from multiple providers 704. Thereafter, the |I| subset of infected machines from the MP is disinfected 705 and their corresponding disinfection timestamps $T_{dis_k}$ 706 saved. In 707, |B| blacklists are again fetched with the purpose of determining if the disinfections have been detected (T↓ ([(rep)]↓k)) by the different providers. With the collected timestamps $T_{inf_k}$, $T_{dis_k}$ and $T_{rsp_k}$ during this process it is now possible to compute both the infection ($\lambda_{inf}$) and disinfection ($\lambda_{dis}$) latencies 708 and later store those values in the L matrix 709.

The process described in FIG. 7 is infinitely repeated in background while Internet hosts perform queries and try to access 202 to the online service 210. Finally, the latency values that are stored in the L matrix are later used for computing and updating the required γ and χ values in the blacklist score table 503.

A possible implementation of the abovementioned processes is depicted in FIG. 2 and FIG. 5. The reputation unit 203 generates the corresponding δ(IP) score 204 for a given IP address by querying both the reputation table 501 and blacklist score table 503. The values stored in those tables are generated and maintained with the help of a fetching unit 209 which periodically fetch information from blacklist providers, a checking unit 208 that performs matches between the fetched blacklists and infected IP addresses from the MP 303, and a processing unit 207 that performs all latency computations required for calculating γ($B_i$) and χ($B_i$). Those computations are performed with the help of a multiplier 505 and an adder 506. Finally, if the obtained δ(IP) score 204 is greater than a pre-established threshold value or threat level 205 the pending online transaction 206 is rejected.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A computer-implemented method for evaluating the reliability of blacklists from providers, a blacklist comprising a list of IP addresses of computers considered infected by a provider, the method comprising the steps of:
    gathering time of infection and IP address for each computer in a group of infected computers pertaining to a malware pool;
    fetching at least one blacklist from at least one provider;
    and for each blacklist of the at least one blacklist and for each computer in the group:
        checking whether there exists in the blacklist an IP address matching an IP address of a computer in the group and registering a first presence of each matching IP address in the blacklist,
        calculating a blacklist IP latency for the first presence of each matching IP address in the blacklist in dependence upon the time of infection of the computer having the IP address and the time of fetching the blacklist,
        estimating a blacklist reliability degree in dependence upon the number of matching IP addresses in the blacklist and the corresponding blacklist IP latencies.

2. The method of claim 1, wherein the step of fetching at least one blacklist is repeated at intervals of time.

3. The method of claim 1, wherein the step of estimating a blacklist the reliability degree comprises:
    calculating, for a blacklist, a value for blacklist responsiveness in dependence upon the average blacklist IP latencies and the number of computers in the group.

4. The method of claim 1, wherein the step of estimating a blacklist reliability degree comprises:
    calculating, for a blacklist, a value for blacklist completeness in dependence upon the number of matching IP addresses in the blacklist and the number of computers in the group.

5. The method of claim 1, further comprising the steps of:
    calculating, for each blacklist, a value for blacklist responsiveness in dependence upon the average blacklist IP latencies and the number of computers in the group;
    calculating, for each blacklist, a value for blacklist completeness in dependence upon the number of matching IP addresses in the blacklist and the number of computers in the group.

6. The method of claim 5, further comprising the steps of:
    storing in a blacklist score table a first type of elements representing encoded values of the blacklist responsiveness and a second type of elements representing encoded values of the blacklist completeness.

7. The method of claim 5, further comprising the steps of:
    calculating a blacklist trustworthiness, as a function of the blacklist responsiveness and the blacklist completeness;
    assigning a threshold for the blacklist trustworthiness;
    classifying an IP address of a host in response of checking whether the IP address of the host is comprised in a blacklist having a blacklist trustworthiness greater than the threshold.

8. The method of claim 5, further comprising the steps of:
    calculating an IP reputation score of an IP address as a function of the blacklist responsiveness, the blacklist completeness, and the presence of the IP address in the blacklist, for each blacklist;
    assigning a safety threshold for the IP reputation score;
    receiving a transaction request from an IP address of a host;
    denying the transaction request in response of the result of checking whether the IP reputation score for the IP address of the host is greater than the safety threshold.

9. The method of claim 1, further comprising the steps of:
    disinfecting each computer in the group of infected computers pertaining to the malware pool,
    re-fetching at least one blacklist previously comprising at least one IP address of a computer in the group,
    for each IP address previously comprised in the blacklist, checking whether is not comprised in the blacklist being re-fetched and registering a first non-presence of the IP address in the blacklist,
    calculating a blacklist IP disinfection latency for each non-present IP address of the blacklist in dependence upon the time of disinfection of the computer having the said IP address and the time of re-fetching the blacklist, estimating a blacklist disinfection reliability degree in dependence upon the number of matching IP addresses in the blacklist and the corresponding IP blacklist latencies.

10. A computer-implemented system for evaluating the reliability of blacklists from providers, a blacklist comprising a list of IP addresses of computers considered infected by a provider, the system comprising:

a fetching unit on a processor and configured to gather time of infection and IP address for each computer in a group of infected computers pertaining to a malware pool, the fetching unit further configured to fetch at least one blacklist from at least one provider, a checking unit on a processor and configured to receive information from the fetching unit, the checking unit configured to check for each computer in the group whether there exists in the at least one blacklist an IP address matching an IP address of a computer in the group and to register a first presence of each matching IP address in the at least one blacklist, a processing unit on a processor and configured to interchange information with the checking unit and configured to calculate a blacklist IP latency for the first presence of each matching IP address in the at least one blacklist in dependence upon the time of infection of the computer having the matching IP address and the time of fetching the at least one blacklist, the processing unit further configured to estimate a blacklist reliability degree in dependence upon the number of matching IP addresses in the at least one blacklist and the corresponding blacklist IP latencies.

11. The system of claim 10, wherein the processing unit is configured to:

calculate, for a blacklist, a value for blacklist responsiveness, in dependence upon the average blacklist IP latencies and the number of computers in the group.

12. The system of claim 10, wherein the processing unit is configured to:

calculate, for a blacklist, a value for blacklist completeness in dependence upon the number of matching IP addresses in the blacklist and the number of computers in the group.

13. The system of claim 10, wherein the processing unit is configured to:

calculate a value for blacklist responsiveness for a blacklist, in dependence upon the average blacklist IP latencies and the number of computers in the group, calculate a value for blacklist completeness in dependence upon the number of matching IP addresses in the blacklist and the number of computers in the group, calculate a blacklist trustworthiness, as a function of the blacklist responsiveness and the blacklist completeness.

14. The system of claim 13, further comprising a reputation unit on a processor and configured to receive information from the processing unit, the reputation unit further configured to calculate an IP reputation score of an IP address as a function of the blacklist responsiveness, the blacklist completeness, and the presence of the IP address in the blacklist, for each blacklist.

15. The system of claim 14, wherein the reputation unit is configured to check whether a safety threshold for the IP reputation score of an IP address is surpassed.

16. The system of claim 15, wherein the reputation unit is configured to receive a transaction request from an IP address of a host and to deny the transaction request in response of the result of checking whether the IP reputation score for the IP address of the host is greater than the safety threshold.

17. The system of claim 14, wherein the fetching unit, the checking unit, the processing unit and the reputation unit are on a single processor.

\* \* \* \* \*

UNITED STATES PATENT AND TRADEMARK OFFICE
CERTIFICATE OF CORRECTION

PATENT NO. : 8,516,595 B2
APPLICATION NO. : 12/980056
DATED : September 23, 2014
INVENTOR(S) : Oro Garcia et al.

It is certified that error appears in the above-identified patent and that said Letters Patent is hereby corrected as shown below:

In the Claims

Col. 8, Line 57, Claim 9 should read

9. The method of claim 1, further comprising the steps of:

- disinfecting each computer in the group of infected computers pertaining to the malware pool,

- re-fetching at least one blacklist previously comprising at least one IP address of a computer in the group,

- for each IP address previously comprised in the blacklist, checking whether <u>the IP address</u> is not comprised in the blacklist being re-fetched and registering a first non-presence of the IP address in the blacklist,

- calculating a blacklist IP disinfection latency for each non-present IP address of the blacklist in dependence upon the time of disinfection of the computer having the said IP address and the time of re-fetching the blacklist,

- estimating a blacklist disinfection reliability degree in dependence upon the number of matching IP addresses in the blacklist and the corresponding IP blacklist latencies.

Signed and Sealed this
Second Day of December, 2014

Michelle K. Lee
*Deputy Director of the United States Patent and Trademark Office*